Nov. 21, 1967  H. J. DINENNO  3,354,266
ISOPHOTE CONVERTER
Filed May 25, 1964  3 Sheets-Sheet 1

INVENTOR.
HENRY J. DINENNO
BY
ATTORNEY

Nov. 21, 1967  H. J. DINENNO  3,354,266
ISOPHOTE CONVERTER
Filed May 25, 1964  3 Sheets-Sheet 2
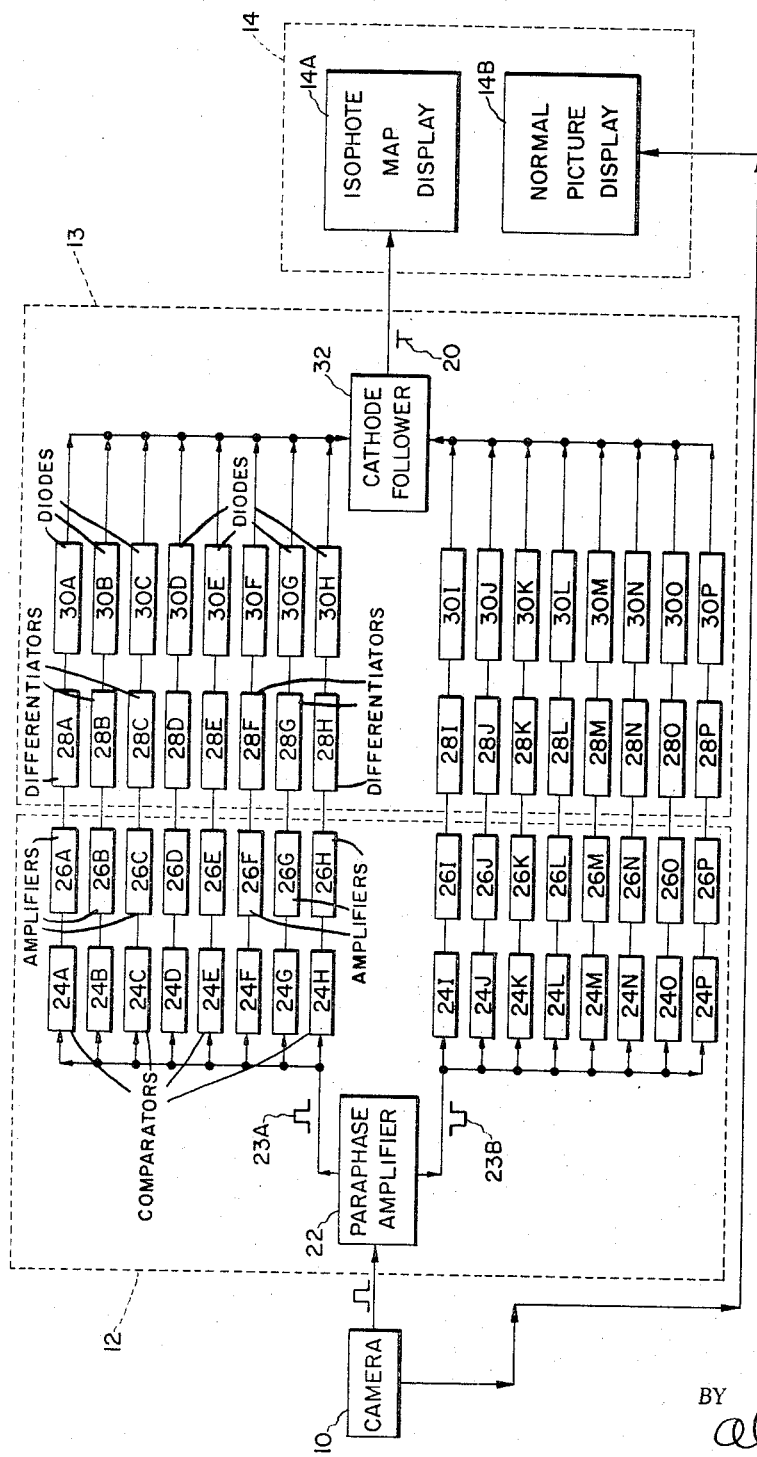
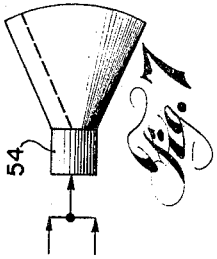
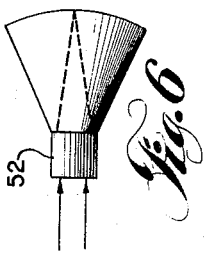
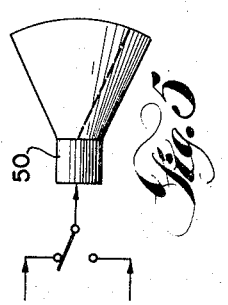
INVENTOR.
HENRY J. DINENNO
BY
ATTORNEY

United States Patent Office 3,354,266
Patented Nov. 21, 1967

3,354,266
ISOPHOTE CONVERTER
Henry J. Dinenno, Downey, Calif., assignor to
North American Aviation, Inc.
Filed May 25, 1964, Ser. No. 369,977
10 Claims. (Cl. 178—6.8)

ABSTRACT OF THE DISCLOSURE

Electronic circuitry for producing an isophote display wherein narrow precisely-positioned lines connect points of equal brightness; comprising a quantizing circuit for establishing discrete levels of an input signal, circuitry for causing changes of level to produce control pulses, and a display device on which said control pulses produce an isophote display.

---

This invention relates to an isophote converter; and more particularly to apparatus for producing a contour-type map wherein sets of lines show the location of points having equal intensities of light.

Contour-type maps are well-known, being used in weather forecasting, surveying, etc., since the contour-type map can provide certain types of information more quickly than other types of maps. For example, a weather forecasting contour-map has a series of more-or-less concentric lines that connect points of equal barometric pressure; the lines being known as "isobars," and being capable of quickly indicating the locations of high-pressure or low-pressure areas.

Similarly, a surveying contour-type map has a series of more-or-less concentric lines that connect points of equal elevation above sea level; the lines being known as "isohypses," and being capable of quickly indicating the locations of hills and valleys.

In a like manner, an isophote-map is a contour-type map that may have a series of more-or-less concentric lines that connect points of equal light intensity; the lines being known as "isophotes."

A contour-type isophote map has specific advantages over the usual picture; and these advantages will be recognized from a consideration of the eye.

The eye, although a very sensitive organ, has a number of limitations. One of the limitations is a phenomenon which might be called "minimal threshold detection." This is a phenomenon wherein the eye sees only light above a given threshold intensity; all light images below this threshold of illumination being invisible. This explains why a person has difficulty seeing some objects in a dimly-lighted room. However, certain devices—such as cameras—are more sensitive than the eye; and can detect objects that are below the eye's threshold.

Another phenomenon of the eye is that it can distinguish changes in light intensity only when the changes exceed a certain minimum value. This explains why a person will call an illumination level "grey"; whereas certain devices can detect various shades of gray.

These eye-characteristics mean that if the eye studies a solar flare, or the flaming exhaust from a rocket engine, it sees an overall light-pattern; whereas, in actuality, certain portions are slightly lighter or darker than other portions. Moreover, the eye has difficulty in discerning where the rocket engine's exhaust fades out, since the eye—unlike some pickup devices—is insensitive to the infrared radiation.

As will be shown later, isophote maps overcome these disadvantages associated with the eye.

Isophote maps can be extremely useful for analyzing aerial views, solar flares, rocket-engine exhausts, or the like—either from photographs, or from the actual occurrences. For example, in the case of rocket-engine exhausts, if the lines of the isophote map show a deviation from concentricity, this deviation may indicate unsatisfactory combustion or design, a result that cannot be discerned by the unaided eye.

Similarly, in the case of the aerial photograph, an isophote map tends to eliminate some details, and to emphasize the remaining information. For example, a building hidden in a forest may be extremely difficult to locate visually or from an aerial photograph. However, the light reflected from the forest would tend to be of uniform intensity; whereas the light reflected from the building would tend to have high-intensity areas, caused by particularly-high-reflectivity portions of the building. The actual light-intensities, or the gradations thereof, may be indiscernible to the eye; but the lines of an isophote-map would tend to comprise series of concentric circles or parallel lines that indicate windows, chimnies, sharp corners, and the like; closely-spaced lines indicating a rapid change of light intensity, whereas distantly-spaced lines indicate a relatively slow rate of change of brightness. This peculiar pattern of isophote lines would be absent from the portion of the isophote-map that related to the forest. As a result, the building would stand out sharply in the isophote-map.

It may thus be seen that an isophote-map can be used to provide information that is not readily available to the eye.

In the past, contour-type maps were generally hand-drawn, by taking equal-valued points from one map, transferring them to another map, and connecting the equal-valued points by suitable contour lines; this being a generally unsatisfactory procedure.

Objects and drawings

It is, therefore, an object of the present invention to provide improved means for producing an isophote-map.

It is another object of the invention to provide an isophote-map having precisely spaced isophote lines.

It is a further object of the invention to provide electronic circuitry capable of selecting the same level for positive-going and for negative-going signals.

The attainment of these objects, and others, will be realized from the following specification, taken in conjunction with the drawings, of which:

FIG. 3 shows a block diagram of an isophote converter system;

FIGS. 5–7 show different ways of producing a display.

Summary

Broadly speaking, the present invention contemplates the conversion of a pictorial display into an isophote-map. It achieves this result by converting information corresponding to a pattern of changing light intensities into a pattern that corresponds to different levels of light intensities; this conversion process being known as "quantizing," and being defined in the IRE Dictionary of Electronic Terms and Symbols. The quantized light-intensity information, after processing, produces an isophote-map on a receiver, such as a television-type tube or apparatus that produces a permanent record.

Simultaneously, the original information may be used to provide a normal picture on the same, or on a different receiver.

In this way the isophote-map can be compared with the normal picture; or can be superposed onto the normal picture to provide a direct comparison.

Detailed description

Figure 1:
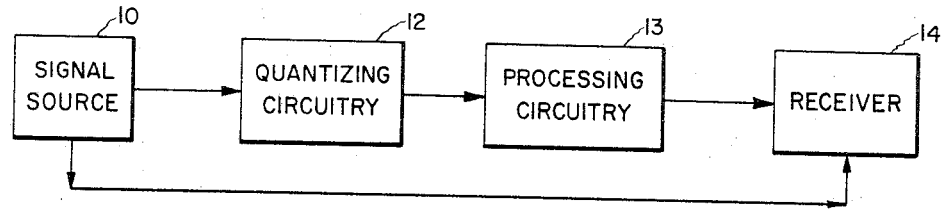
FIG. 1 shows a block diagram of the inventive concept.

The basic concept of the present invention will be understood from FIG. 1. Here a signal source 10 provides an electrical signal that corresponds to the object, which —as previously indicated—may be an aerial photograph, a rocket-engine exhaust, a solar flare, or the like. The output of signal source 10 is applied to a quantizer 12 and to processing circuitry 13 (both to be more fully described later), that quantizes the signal into a number of discrete levels. The quantized and processed signal is applied to a receiver 14 that produces an isophote-map.

A slight digression is necessary at this point, in order to understand the production and use of the various signals. It is known that a television-type tube (more correctly called a cathode-ray tube) contains an "electron gun" that directs a stream of electrons toward the faceplate of the tube. The inner surface of the tube's faceplate is coated with a film of fluorescent material that glows at the point of electron-stream-impingement; and circuitry causes the electron stream to sweep, or "scan," back-and-forth and up-and-down to form a series of parallel glowing lines called a "raster."

As the electron stream scans back-and-forth to form the raster, the incoming signal changes—or "modulates"— the intensity of the electron stream, so that the electron-beam-impingement on the fluorescent film produces bright and dim spots of light, whose intensities depend upon the incoming signals.

The bright and dim spots of light of a line of the raster coact with the bright and dim spots of light of adjacent lines of the raster to form a picture. Thus, the electron stream "paints" a picture that corresponds to the incoming signal.

In a similar manner, a television camera has an electron stream that scans back-and-forth; the intensity of the camera's electron stream being modulated in accordance with the scene, picture, solar flare, etc., that the camera is viewing. Suitable circuitry causes the electron stream of the camera to move in synchronism with the electron stream of the television-type tube in the receiver, each line of the camera's raster corresponding with a line of the television tube's raster. In this way, a television camera views a scene, object, photograph, etc., and "transduces" the light therefrom into an electrical signal. It thus serves as the signal source 10 of FIG. 1.

Figure 2A:
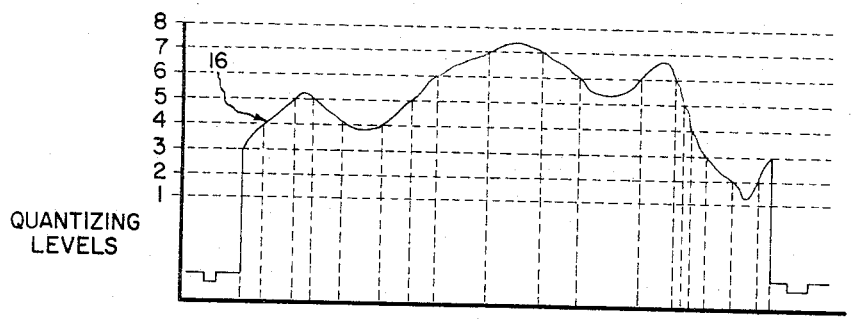
FIG. 2 shows waveforms that occur in various parts of the invention.

Referring now to FIG. 2A, there is illustrated a waveform 16 that represents the information from signal source 10 of FIG. 1; waveform 16 of FIG. 2A representing an analog voltage that corresponds to a single line of a raster. It will be noted that the central portion of waveform 16 is continuously varying; and thus represents different shades of grey that merge into each other—and the end portions of waveform 16 containing pulses that synchronize the operation of the camera receiver.

Figure 2B:
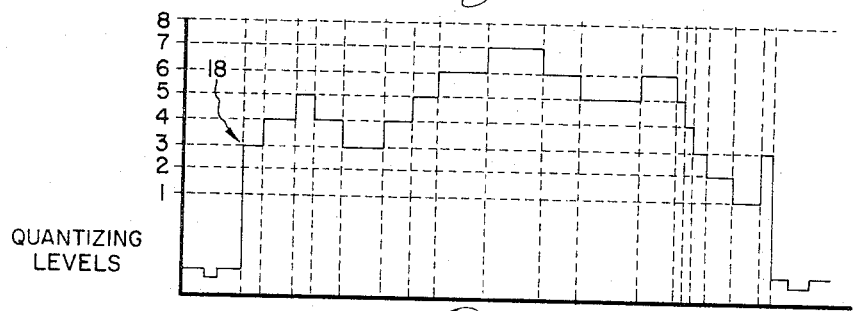

Waveform 16 is then quantized (by means to in effect be described later), to produce the quantized waveform 18 of FIG. 2B. It will be noted that the waveform 18 may be quantized to eight discrete levels; although under other conditions, more or fewer levels may be used. In the quantizing operation, every time that an increasing, or "positive-slope" portion of waveform 16 exceeds a given quantizing level, waveform 18 has a step-like configuration. Similarly, every time that a decreasing, or "negative-slope" portion of waveform 16 falls below a given quantizing level, waveform 18 has a step-like configuration.

The quantized waveform 18 of FIG. 2B and suitable processing circuitry (to be described later) produces a converted waveform—19 of FIG. 2C—that contains a control pulse such as 20A, 20B, 20C, etc., for each time that the quantized waveform 18 changes from one level to another. In the converted waveform shown in FIG. 2C, each pulse indicates a change of level of quantized waveform 18; the pulses being of the same amplitude and polarity and width.

Figure 2C:
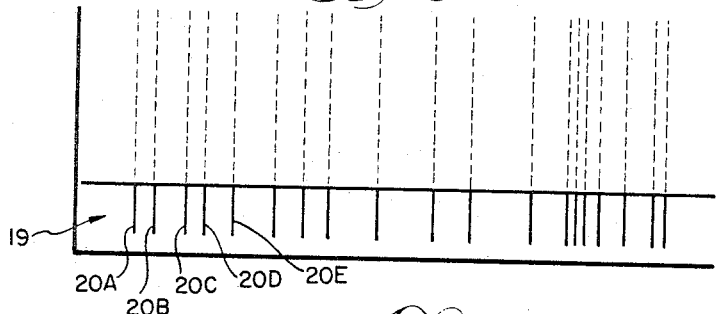

When the pulses 20A, 20B, 20C, etc., of FIG. 2C are applied to a receiver, such as 14 of FIG. 1, each pulse modulates the intensity of the electron stream; in this case decreasing the intensity of the electron stream, and thus causing the receiver to produce a dark spot on a raster line on the faceplate. Each spot of the raster-line coacts with the spots of adjacent raster-lines to form continuous lines that produce the isophotes that form the isophote-map.

Since each pulse of FIG. 2C has the same amplitude and polarity, the isophotes of the isophote-map are equally dark, so that the isophote contour-lines appear continuous.

The quantizing operation requires electronic comparators, which are well known, and generally consist of a device, or devices, that become electrically conductive, or non-conductive, when an input signal exceeds or falls below a pre-selected value. For example, a simple comparator may comprise an electron tube that turns on when the positive-slope input signal exceeds a predetermined threshold level, and turns off when the negative-slope input signal falls below the predetermined threshold level.

Most comparators suffer from the disadvantage known as "hysteresis," wherein their turn-on and turn-off levels are slightly different for increasing signals (i.e., signals having a positive slope) and for decreasing signals (i.e., signals having a negative slope). For purposes of the present invention, it is important that all crossings of a predetermined threshold level be indicated accurately, whether the crossing be of one sense or the other. Thus, the hysteresis may introduce intolerable error.

The present invention includes circuitry that overcomes this hysteresis disadvantage, as shown in block diagram form in FIG. 3. Here the signal from a source 10, such as a television camera, is applied to a quantizer 12. Quantizer 12 comprises a paraphase amplifier 22 that preferably amplifies the input signal, and produces positive-going and negative-going output signals 23A and 23B. Alternatively, other devices such as phase-splitters, may be used to produce positive-going and negative-going signals, without necessarily providing amplification. These output signals are applied to a set of comparators 24A thru 24P; various comparators being adjusted to become conductive, and to produce trigger signals, at different preset threshold levels. Comparators 24A through 24H are designed to operate upon increasing, positive-slope, signals, and comparators 24I through 24P are designed to operate upon decreasing, negative-slope signals.

For simplicity, the operation of a single channel (A) will be explained in detail, the other channels operating in the same or a similar manner, as will be described later.

The trigger signal from comparator 24A is preferably amplified by an amplifier 26A, whose output is then applied to processing circuitry 13. Processing circuitry 13 comprises a pulse-shaping differentiator 28A that produces a negative-going pulse for the leading edge of the trigger signal. A polarity-control diode 30A assures that only pulses of the desired polarity, negative in this illustration, are transmitted to cathode-follower 32, the output therefrom being applied to receiver 14A.

As previously indicated, the receiver may comprise a television-type tube that produces the isophote-map; the negative-going pulses 20A, 20B, 20C, etc., of FIG. 2C producing dark isophote lines on a bright background.

Channels I through P operate in the same manner, except that the negative-going input signal 23B is used; comparators 24I through 24P also have individually preset threshold levels.

Figure 4:
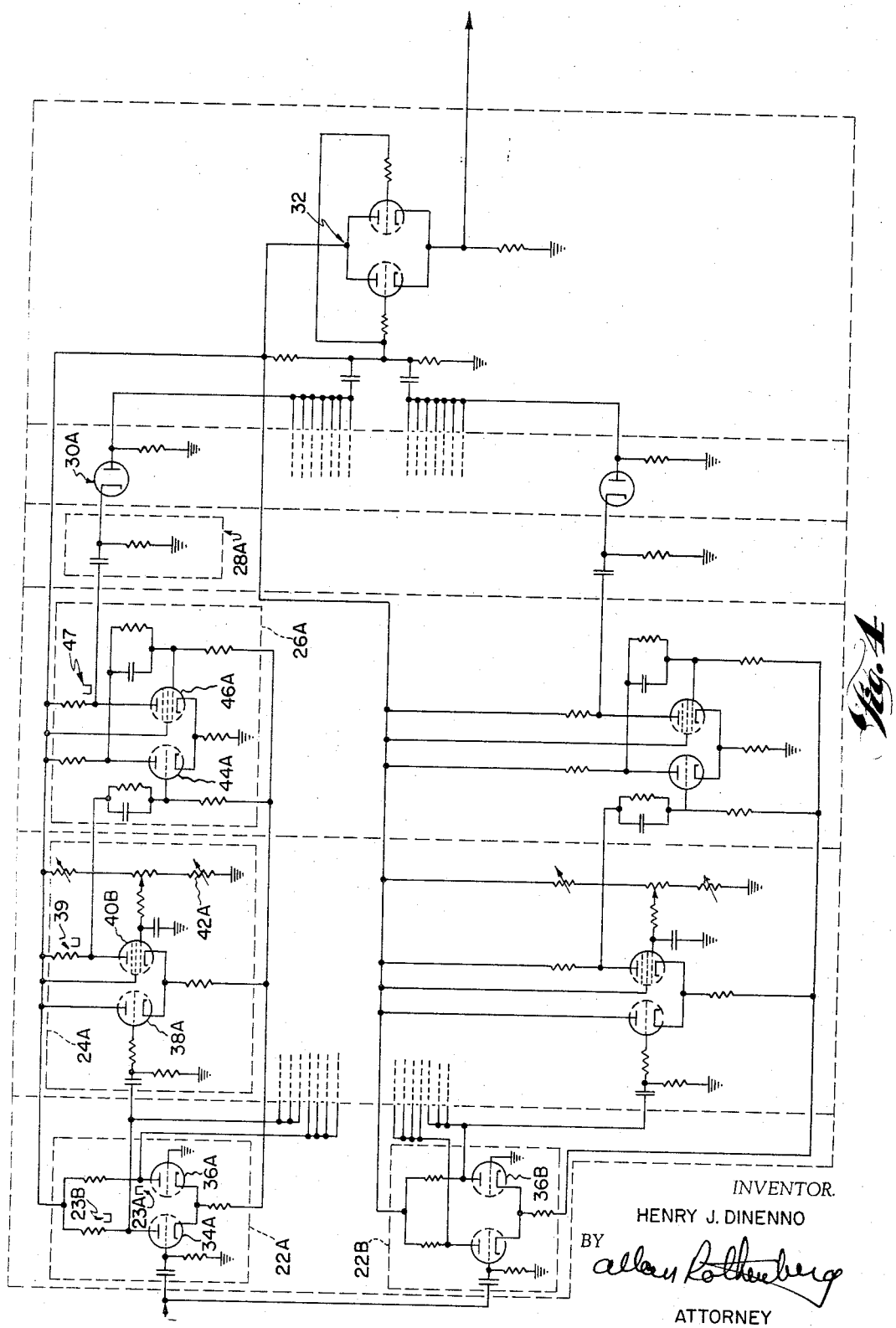
FIG. 4 shows a schematic diagram of one way to practice the invention.

FIG. 4 shows a schematic diagram of a circuit for practicing the invention, this diagram permitting a more detailed explanation of the operation. This circuit differs from the previous shown block-diagram in that it comprises two paraphase amplifiers, 22A and 22B, for dividing the load. A positive-slope portion of the input signal (16 of FIG. 2A) causes paraphase-amplifier tube 34A to produce a negative-going output signal (23B of FIG. 3) and causes paraphase-amplifier tube 36A to produce a positive-going signal 23A of FIG. 3).

As before, the operation of a single channel will first be described in detail. The negative-going signal 23B from the plate of paraphase-amplifier-tube 34A is applied to the grid of tube 38A of comparator 24A, causing the comparator tube 40B to initiate a negative-going trigger signal 39. Comparator 24A acts somewhat like a differential amplifier, that is, a pre-set threshold level is established by a potential-setting device such as potentiometer 42A; and when the positive-slope input signal exceeds the preset threshold level, the comparator produces the negative-going trigger signal 39. The trigger signal may be amplified by a trigger amplifier 26A, in order to initiate a fast "rise-time" negative-going signal 47; the fast-rise-time signal 47 being applied to a differentiator circuit 28A that converts the leading edge of the fast-rise-time signal 47 into a negative-going pulse-like signal (20A of FIG. 2C) that is passed through negatively-poled diode 30A to cathode-follower 32. Thus, a positive-slope input signal produces a negative-going pulse-like signal that produces a black spot at the receiver.

It will be noted that the setting of potentiometer 42A establishes a first quantizing level for positive-slope input signals. A second quantizing level for positive-slope input signals is established by a similar comparator, not illustrated in FIG. 4, whose potentiometer is set at a different reference level. In a similar manner, other similar circuits establish third and fourth quantizing levels for positive-slope input signals.

Another paraphase amplifier, 22B, and similar circuits, establish four other quantizing levels for positive-slope input signals, to provide a total of eight in the illustrated embodiment.

Referring back to FIG. 2A, it will be noted that the illustrative input signal 16 is originally of increasing amplitude, and that when it exceeds a quantizing level—such as quantizing level four, for example—a particular comparator, such as 24D of FIG. 3, will be activated to produce a negative-going pulse 20B of FIG. 2C. This particular comparator will remain activated until the amplitude of the input signal drops below quantizing level four, whereupon the comparator is de-activated. Unfortunately, as previously indicated, in prior-art circuits the activation level is not identical with the de-activation level, causing the aforementioned hysteresis.

It was previously stated that the disclosed circuit obviates, hysteresis, and this operation will be understood from the following explanation. When the positive-slope input signal reverts to a negative-slope, and drops below a pre-set threshold level, the previously-activated comparator is de-activated to terminate the trigger signal; although the de-activation is at a somewhat different level than the activation. In the present circuit, the termination of the trigger signal causes the differentiator to produce a positive-going pulse, which is blocked by diode 30. In this way, only the activation characteristic of the comparator, and its resultant negative pulse, is used; the de-activation characteristic, which in prior-art circuits produced the hysteresis, being unused.

Negative-slope input signals are handled by the second paraphase-amplifier-tube 36A, which—under this condition—produces a negative-going signal similar to 23B. This signal activates the negative-slope comparators in a manner similar to that described above in connection with the positive-slope comparators, to produce trigger signals whose leading edges provide negative-going pulses that are applied to cathode-follower 32. Thus, the activation characteristic of the negative-slope comparators is used, whereas—as indicated above—the de-activation of the comparator causes termination of the trigger signals, which in turn produces a positive-going pulse that is blocked by diode 30.

Thus, input signals may be quantized—by an arrangement of positive-slope and negative-slope comparators—into eight different levels; each positive-slope level and each negative-slope level being established by an individual comparator circuit that may be individually pre-set in order to compensate for differences in individual tubes, electronic components, etc. In this way, a set of trigger signals is produced, the trigger signals corresponding to the various quantizing levels. Moreover, only the turn-on characteristic of the tubes used; the turn-off characteristics being prevented, by the polarity-control diode, from producing a signal that reaches cathode-follower 32. In this way, the disclosed circuit obviates hysteresis, and produces an isophote-map wherein the isophotes are properly spaced to provide accurate information about the rate of change of the brightness.

As previously explained, the output of cathode-follower 32 is applied to a receiver, such as a television-type tube. In the illustrated case, the output of the cathode-follower is a series of negative-going signals that decrease the electron beam intensity in the television-type tube to produce black spots on a raster-line. The black spots of each raster-line coact with the black spots of adjacent raster-lines to product a series of black isophote lines that form the isophote-map.

Alternatively the circuit may be modified to produce bright spots on a dark background, for example by using an inverter to invert the polarity of pulses 20A, 20B, 20C, etc., of FIG. 2C, so that they increase the intensity of the electron stream. If desired, further modification, such as non-linear circuitry, may be used to control the amplitude of pulses 20A, 20B, 20C, etc., in accordance with the quantized level, so that the isophotes will have a brightness or darkness corresponding to the actual light intensity.

If desired, only a single quantizing level may be displayed; this result being achieved by suitable setting of the potentiometers, or by suitable switches that prevent certain pulses from reaching the cathode-follower. Alternatively, a plurality of trigger signals (meaning signals corresponding to two or more quantizing levels) may be used to form the isophote-map.

Referring back to FIG. 3, this drawing shows a second receiver 14B, which is energized directly from the signal source 10 to produce a normal picture of the rocket-engine exhaust, solar flare, etc. Thus, the isophote-map on receiver 14A may be compared with the normal picture on receiver 14B. Alternatively, as indicated in FIG. 1, the isophote-map and the normal picture may both be superposed on a single receiver; the isophote-map, in this way directing attention immediately to the pertinent portions of the normal picture.

This superposing may be accomplished in a number of different ways. For example, FIG. 5 symbolizes a single-electron-beam cathode ray tube 50. Two input signals, representative of the isophote-map and the normal picture, may be used alternatively in a time-sharing manner to intensity-modulate the single electron beam, and to produce sequential superposed displays. FIG. 6 symbolizes a dual-electron-beam cathode ray tube 52, wherein the two input signals are used to intensity-modulate their respective electron beams, and to produce two simultaneous superposed displays. FIG. 7 symbolizes a single-electron-beam cathode ray tube 54 wherein the two input signals are added, and used to modulate the single electron beam in order to produce a composite superposed display.

While the foregoing explanation has been presented in terms of a television camera, it is within the scope of the present invention to use other types of input signals, such as codes, photographs, information on magnetic or electrostatic tape, or the like, these being called pictorial displays. Similarly, while the foregoing explanation has been presented in terms of a receiver such as a television-type tube, it is also within the scope of the present invention to use other receivers, such as magnetic or electrostatic tape, photographic film, xerographic equipment, or the like; these also being called pictorial displays.

Although the invention has been described and illustrated in detail, it is to be clearly understood that the same is by way of illustration and example only, and is not to be taken by way of limitation; the spirit and scope of this invention being limited only by the terms of the appending claims.

What is claimed is:
1. The combination comprising:
   a source of information;
   means, comprising electronic comparator circuitry, for quantizing the information from said source, and producing control-pulses corresponding to selected level changes of said information; and
   means for causing said control-pulses to produce an isophote display.
2. The combination comprising:
   a source of video information;
   means, comprising an all-electronic comparator circuit, for converting said video information to a pulse train of pulses having equal widths regardless of the rate of change of said information; and
   means for causing said equi-width pulses to produce a fine-line isophote-map.
3. The combination comprising:
   (A) a source of information;
   (B) electronic circuitry means for quantizing said information, comprising
      (1) circuit means for separating said information into positive-going and negative-going signals;
      (2) means for selecting given levels of said positive-going and said negative-going signals;
   (C) polarity-control means for causing said selected levels to produce a display of said quantized information.
4. The combination comprising:
   (A) a source of video information;
   (B) electronic circuitry means for quantizing said video information, comprising
      (1) circuit means for separating said information into positive-going and negative-going signals;
      (2) comparator-circuit means for selecting given electrical levels of said positive-going and said negative-going signals;
   (C) polarity control means, comprising a differentiator and a diode, for producing a control pulse each time said signals cross any of said electrical levels;
   (D) means for causing said control pulses to produce an isophote-display.
5. An isophote converter comprising:
   transducer means for providing an analog electrical signal having a magnitude that varies in accordance with intensities of light;
   positive-slope and negative-slope quantizing means comprising a first arrangement of electrical signal comparison means for providing a trigger signal whenever the analog signal increases to a value greater than any one of a group of pre-set threshold values, and a second arrangement of electrical signal comparison means for providing a trigger signal whenever the analog signal decreases to a value less than any one of said group of said pre-set threshold values; and
   means, energized by said trigger signals, for producing and displaying pulses corresponding to at least one of said group of pre-set threshold values.
6. An isophote converter comprising:
   optical-to-electrical transducer means for providing an analog electrical signal having a magnitude that varies in accordance with intensities of light received from an object being viewed by the transducer means;
   positive-slope and negative-slope quantizing means comprising a first arrangement of electrical signal comparison means for providing a first set of trigger signals whenever the analog signal increases to values greater than a plurality of a group of pre-set threshold values, and a second arrangement of electrical signal comparison means for providing a second set of trigger signals whenever the analog signal decreases to values less than a plurality of said group of said pre-set threshold values; and
   means for producing and displaying pulses corresponding to said sets of trigger pulses.
7. An isophote converter comprising:
   a video viewing device;
   first and second paraphase amplifiers each responsive to the output of the video device, each amplifier providing a positive-going and a negative-going output signal;
   a plurality of positive-going quantizer channels, some of said positive-going channels having inputs responsive to the positive-going output of the first paraphase amplifier and others of the positive-going channels having inputs responsive to the positive-going output of the second paraphase amplifier;
   a plurality of negative-going quantizer channels, some of the negative-going channels having inputs responsive to the negative-going output of the first paraphase amplifier, and others of the negative-going channels having inputs responsive to the negative-going output of the second paraphase amplifier, each said positive-going and negative-going channels comprising a comparator providing the channel input;
   a plurality of trigger amplifiers responsive to the output of respective comparators;
   a plurality of differentiators responsive to the output of respective trigger amplifiers;
   a plurality of diode means responsive to respective differentiators, for providing outputs of a given polarity from respective channels;
8. An isophote converter comprising:
   a video viewing device;
   first and second paraphase amplifiers each responsive to the output of the video device, and each providing first and second output signals of mutually opposite polarity;
   a plurality of quantizer channels, some of said channels being responsive to the first output of the first paraphase amplifier, others of said channels being responsive to the first output of the second paraphase amplifier, others of said channels being responsive to the second output of the first paraphase amplifier, and others of the channels being responsive to the second output of the second paraphase amplifier, each said channel comprising a comparator providing the channel input;
   a plurality of differentiators responsive to respective comparators;
   a plurality of diode means responsive to respective differentiators, for providing outputs of a given polarity from respective channels;
   a cathode follower having an input connected with all said diodes means, and having an output, and
   a cathode ray tube, having an intensity-modulated input, connected to receive the output of the cathode follower.
9. An isophote converter comprising:
   a source of signals;
   a plurality of quantizer channels responsive to the output of said signal source, each said channel comprising electronic comparator circuitry for providing the channel inputs;
   pulse-shaping means, responsive to the output of respective quantizer channels, for producing control-pulses; and means for applying said control-pulses to an isophote-display-producing device.

10. An isophote converter comprising:
a signal source;
a paraphase amplifier responsive to the output of said signal source;
a plurality of positive-going and negative-going quantizer channels responsive to the respective positive and negative-going outputs of the paraphase amplifier, each of said channels comprising an electronic comparator circuit for providing the channel input;
a plurality of pulse-shaping means responsive to the output of respective quantizer channels;
a video viewing device; and
means for applying the output of said pulse-shaping means to said viewing device.

References Cited
UNITED STATES PATENTS

| | | | |
|---|---|---|---|
| 3,017,456 | 1/1962 | Schreiber | 178—6 |
| 3,214,515 | 10/1965 | Eberline | 178—6.8 |

JOHN W. CALDWELL, *Primary Examiner.*

DAVID G. REDINBAUGH, *Examiner.*

H. W. BRITTON, *Assistant Examiner.*